3,118,855
BINARY BLENDS OF STYRENE/ACRYLONITRILE COPOLYMER AND BUTYL ACRYLATE/ACRYLONITRILE COPOLYMER AND METHODS FOR PREPARING THE SAME
James A. Herbig and Ival O. Salyer, Dayton, Ohio, assignors to Monsanto Chemical Company, St. Louis, Mo., a corporation of Delaware
No Drawing. Filed July 21, 1960, Ser. No. 44,284
12 Claims. (Cl. 260—45.5)

This invention relates to styrene/acrylonitrile copolymers. In one aspect, this invention relates to styrene/acrylonitrile copolymer compositions comprising binary blends of styrene/acrylonitrile copolymers and butyl acrylate/acrylonitrile copolymers. In another aspect, this invention relates to methods for making binary blends of styrene/acrylonitrile copolymers and butyl acrylate/acrylonitrile copolymers.

Copolymers of styrene with acrylonitrile, especially those containing from 90 to 50 parts by weight styrene and, correspondingly, from 10 to 50 parts by weight acrylonitrile, constitute an important class of commercial resins, finding widespread use as injection molding material. Unfortunately, styrene/acrylonitrile copolymers of this type have very limited flexibility. In fact, they are comparatively brittle materials which do not show a definite yield point. The tensile elongation of such styrene/acrylonitrile copolymers is of the order of only a few percent and the flexural deflection is very small. Thus, many styrene/acrylonitrile copolymers lack toughness. Although plasticizers can be used to improve the toughness of styrene/acrylonitrile copolymers, the plasticized copolymer invariably has a low heat distortion point or softening point which restricts its use, and the plasticizers tend to exude from the copolymer over a period of time.

We have discovered that improved styrene/acrylonitrile copolymer compositions can be obtained by blending into said styrene/acrylonitrile copolymers a small amount of a butyl acrylate/acrylonitrile copolymer.

An object of this invention is to provide improved styrene/acrylonitrile copolymer compositions.

Another object of this invention is to provide binary polyblend compositions of styrene/acrylonitrile copolymer and butyl acrylate/acrylonitrile copolymer.

Another object of this invention is to improve the flexural properties of styrene/acrylonitrile copolymer compositions without significantly lowering the heat distortion temperature of said copolymer compositions.

Other aspects, objects, and advantages of this invention will be apparent from a consideration of the accompanying disclosure and the appended claims.

In accordance with this invention, improved styrene/acrylonitrile copolymer compositions are made by incorporating small amounts of butyl acrylate/acrylonitrile copolymer in said styrene/acrylonitrile copolymer to form a binary polyblend of the same. The novel binary polyblend compositions of this invention comprise a major proportion of a styrene/acrylonitrile copolymer and a minor proportion of a butyl acrylate/acrylonitrile copolymer. Ordinarily, the binary polyblend compositions of this invention comprise from about 1% by weight to about 10% by weight butyl acrylate/acrylonitrile copolymer and the remainder styrene/acrylonitrile copolymer. Preferably, the styrene/acrylonitrile copolymer polyblend compositions of this invention contain from 2% by weight to 7% by weight of the butyl acrylate/acrylonitrile copolymer. Although the above stated proportions give useful as well as preferred compositions, other compositions outside the stated proportions can also be formed with fewer improvements in physical properties and with improvements to a lesser degree than are obtained in the above-disclosed composition.

The binary styrene/acrylonitrile copolymer compositions of this invention can be prepared by either mechanical methods or by polymerization methods to produce polyblends having a high degree of homogeneity. In the mechanical method, the styrene/acrylonitrile copolymer and the preformed butyl acrylate/acrylonitrile copolymer are intimately admixed together on a conventional mixing machine of the type normally used for mixing rubber or plastics, e.g., a mill rolls, an extruder, or a Banbury mixer. Preferably, the styrene/acrylonitrile copolymer is first placed on the mill rolls and, after a small rolling bank has formed in the nip of the rolls, the butyl acrylate/acrylonitrile copolymer is added. If desired, the styrene/acrylonitrile copolymer and the butyl acrylate/acrylonitrile copolymer, each in disintegrated or divided form, can be admixed together to form a crude admixture which is then placed on the mill rolls. Regardless of the method by which the mixing of these polymers is accomplished, it is necessary that they be admixed together or worked under a sufficient heat and pressure to insure an efficient dispersion of the butyl acrylate/acrylonitrile copolymer in the styrene/acrylonitrile copolymer so as to form a completely homogeneous material. The temperature at which this working or mastication is conducted is not critical so long as the temperature is at least above that where the styrene/acrylonitrile copolymer fuses and not above the temperature where decomposition sets in. Usually a temperature above about 300° F. or 325° F. and less than about 350° F. or 375° F. is sufficient to obtain an adequately intimate combination of the materials. If desired, suitable minor ingredients can also be included in the binary polyblend compositions of this invention, including such ingredients as fillers, dyes, pigments, stabilizers, and the like.

In the polymerization method of preparing the binary polyblend compositions of this invention, the preformed butyl acrylate/acrylonitrile copolymer is admixed in the styrene and acrylonitrile monomers and the resulting material subjected to polymerization. For best results, this polymerization is carried to a high conversion, such as greater than 95% conversion to high molecular weight styrene/acrylonitrile copolymer. In preparing such a polymerization blend, the butyl acrylate/acrylonitrile copolymer should be thoroughly and intimately dispersed in the monomeric styrene and the acrylonitrile prior to the polymerization.

The foregoing procedures are used by way of example and various combinations of the same, or other procedures, can be employed to form a binary blend composition containing a large proportion of styrene/acrylonitrile copolymer and a minor proportion of butyl acrylate/acrylonitrile copolymer. The preferred method for preparing the binary polyblend compositions of this invention is by mechanically mixing the preformed polymer. It will be understood in this specification and claims that the term "blend" and "polyblend" as used herein include both mechanical blends and blends prepared by polymerizing styrene and acrylonitrile in the presence of preformed butyl acrylate/acrylonitrile copolymer.

The copolymers of styrene/acrylonitrile used in the novel polyblend compositions of the invention include copolymers wherein styrene and acrylonitrile are the sole monomers subjected to copolymerization, as well as copolymers prepared from comonomers which also contain other polymerizable unsaturated comonomers in an amount preferably not exceeding 15 wt. percent of the total comonomers of styrene and acrylonitrile. Examples of such polymerizable unsaturated comonomers which may be present include α-methyl styrene, vinyl toluene, ethyl acrylate, butyl acrylate, methyl methacrylate, and the like. The styrene/acrylonitrile copolymer produced, even if other polymerizable unsaturated comonomers are present, should have a high molecular weight. The styrene/acrylonitrile copolymers used in this invention comprise from 90 to 50 parts by weight styrene and, accordingly, from 10 to 50 parts by weight acrylonitrile; however, other styrene/acrylonitrile copolymer compositions outside this range can also be used with less advantageous results.

The styrene/acrylonitrile copolymers employed in the binary polyblend compositions of this invention are commercially available products and can be made by any of the well known styrene/acrylonitrile copolymerization techniques from monomeric material comprising styrene and acrylonitrile either with or without butyl acrylate/acrylonitrile copolymer present. One common technique is mass polymerization wherein the only material present in the reaction mixture is the monomer plus any catalyst and any modifier that may be used to effect the molecular weight, plus butyl acrylate/acrylonitrile copolymer if it is to be incorporated during the polymerization, and no added solvent or other reaction medium is present. Suitable catalysts for use are those that promote free radicals, e.g., peroxy type and azo type catalysts. Examples of such catalysts include benzoyl peroxide, ditertiary butyl peroxide, diacetyl peroxide, dimethyl phenyl hydroperoxymethane, and α,α'-azo-bisisobutyronitrile. The copolymerization can also be effected by the solvent copolymerization technique which is similar to the mass polymerization technique except that a solvent for the monomers and/or polymers is also present during the polymerization. The copolymerization can also be effected advantageously by suspension or emulsion polymerization techniques. Each of these techniques involves the use of a non-solvent for the monomer and polymer, but in the suspension technique the particles of monomer and ultimately the polymer are comparatively large, while in the emulsion procedure the particles are quite small and the product is a stable latex. For suspension polymerization, a reaction medium such as water is used together with a small amount of a suspending agent, for example, tricalcium phosphate, a vinyl acetate-maleic anhydride copolymer product, or the like, to give a suspension of particles in the initial reaction mixture which are not of sufficiently small size as to result in a permanently stable latex as product. To effect emulsion polymerization, a sufficient amount of emulsifying agent, for example, a water-soluble salt of a sulfonated long-chain alkyl aromatic compound, is employed in suitable quantity along with vigorous agitation whereby an emulsion of the reactants is formed and the product is obtained in the form of a latex. The latex can then be coagulated if desired by known methods and the polymer separated from the water. In those embodiments of the invention wherein styrene and acrylonitrile are copolymerized in the presence of preformed butyl acrylate/acrylonitrile copolymer, the preformed polymer may tend to make it more difficult to form an emulsion than in the case of the monomers alone. However, the emulsion technique has certain advantages particularly in that a very rapid and complete conversion to a high molecular weight product is obtained. Conventional recipes and procedures for effecting mass, suspension and emulsion copolymerization of styrene with acrylonitrile are so well known to those skilled in the art that they need not be reiterated here. Emulsion and suspension polymerization can be effected at temperatures which are chosen in accordance with the catalyst system used but which may, for example, be from 50° C. to 100° C. Mass polymerization is usually most advantageously effected at temperatures within the range of 25° C. to 125° C.

The butyl acrylate/acrylonitrile copolymers utilized in the binary polyblend compositions of this invention are prepared by copolymerizing butyl acrylate with acrylonitrile. For use in this invention, the butyl acrylate/acrylonitrile copolymer should contain a large proportion of butyl acrylate and a minor proportion of acrylonitrile. Preferably, the butyl acrylate/acrylonitrile copolymer employed in this invention is prepared from an admixture of monomers comprising from 85% by weight to 95% by weight butyl acrylate and correspondingly from 15% by weight to 5% by weight acrylonitrile. However, butyl acrylate/acrylonitrile copolymers containing proportions of monomers outside this range can also be used if desired, but usually with less advantageous results.

The butyl acrylate/acrylonitrile copolymers for use in this invention are commercially available products. Examples of some commercially available materials include "Lactoprene BN" and "Acrylon BA-12." Methods for preparing the copolymers of butyl acrylate and acrylonitrile are well known to those skilled in the art and any such methods may be used for preparing such copolymers for use in this invention. Thus, butyl acrylate and acrylonitrile can be copolymerized using the mass, suspension or emulsion polymerization techniques although it is preferred to prepare the copolymer in an emulsion polymerization system. In the emulsion polymerization procedure, polymerization of the butyl acrylate and acrylonitrile comonomers is effected in the presence of water and which contains dissolved therein a suitable catalyst and an emulsion stabilizing agent. Examples of suitable catalysts include ammonium persulfate, benzoyl peroxide, hydrogen peroxide, sodium perborate, and other water-soluble salts of peroxy acids. The quantity of the peroxy compounds used as catalysts may be from about 0.02 to 2.0% by weight of the polymerizable compounds. The emulsion stabilizing agent may be any of the wide variety of wetting agents, which are in general organic compounds containing both hydrophobic and hydrophilic radicals, for example, sodium alkyl sulfate, sulfated aromatic ether alcohol, sodium alkyl aryl sulfonate, fatty alcohol sulfate, sorbitan trioleate, and the like. Ordinarily, the emulsion polymerization is conducted at a temperature in range of from 65° C. to 95° C. depending upon the nature of the polymerization system and the particular catalyst used.

The styrene/acrylonitrile and butyl acrylate/acrylonitrile copolymer polyblends of this invention, prepared as described herein, can also have included therein additional materials, such as plasticizers, stabilizers, fillers, dyes, pigments, other polymers, and the like. These materials can be added to the preformed styrene/acrylonitrile copolymer and the preformed butyl acrylate/acrylonitrile copolymer by milling together or otherwise mixing the added materials with the copolymers, or can similarly be added to the blends of styrene/acrylonitrile copolymer with butyl acrylate/acrylonitrile copolymer, or can be present during the polymerization of styrene and acrylonitrile monomers containing preformed butyl acrylate/acrylonitrile copolymer, provided that such presence does not adversely affect the polymerization process and products to an undesirable extent.

The advantages, desirability and usefulness of the present invention are illustrated by the following example.

EXAMPLE

Styrene/acrylonitrile copolymer polyblends containing varying proportions of butyl acrylate/acrylonitrile copolymer were prepared by mechanically milling the various admixtures on a 3" x 8" Thropp mill rolls at 174° C. A rough mix was first prepared from the preformed polymers in powdered or pelleted form in a stainless steel beaker and then this rough mix was placed on the heated mill rolls and thoroughly homogenized by intensive hot milling for 5 minutes or until an adequate dispersion was obtained. The blends were then sheeted and stripped from the mill rolls. After sufficient cooling, the sheets were cut into 1 to 2 inch squares for convenient feeding to an Abbe grinder for grinding into pellet size for injection molding on a one ounce Watson-Stillman machine.

The physical properties of the blends were then determined on the injection molded samples and are reported in Table I. These properties were determined according to the standard ASTM procedures, more specifically, tensile strength and elongation were determined according to ASTM D-882-46, flexural strength and deflection were determined according to ASTM D-790-49T, and Notched impact strength was determined by the Izod method as set forth in ASTM D-256-47T.

*Table I*

PROPERTIES OF STYRENE/ACRYLONITRILE COPOLYMER AND BUTYL ACRYLATE/ACRYLONITRILE COPOLYMER POLYBLENDS

| Composition, percent | | Tensile Properties | | | | Flexural Properties | | Notched Impact Strength, ft.-lb./in. |
|---|---|---|---|---|---|---|---|---|
| Styrene/ Acrylonitrile Copolymer [1] | Butyl Acrylate/ Acrylonitrile Copolymer [2] | Yield | | Failure | | Strength, p.s.i. | Deflection, inches | |
| | | Strength, p.s.i. | Elong., percent | Strength, p.s.i. | Elong., percent | | | |
| 100.0 | | | | 11,400 | 1.8 | 18,374 | 0.24 | 0.53 |
| 97.5 | 2.5 | 11,000 | 6.7 | 7,979 | 20.4 | 20,894 | 0.31 | 0.61 |
| 95.0 | 5.0 | 10,877 | 6.7 | 9,009 | 15.0 | 21,047 | >0.80 | 0.46 |
| 90.0 | 10.0 | | 6.7 | 9,000 | 6.1 | 18,340 | >0.80 | 0.33 |

[1] Bakelite C-11 type styrene/acrylonitrile copolymer containing 72 wt. percent styrene and 28 wt. percent acrylonitrile.
[2] Acrylon BA-12 type butyl acrylate/acrylonitrile copolymer containing 88 wt. percent butyl acrylate and 12 wt. percent acrylonitrile.

The data in Table I clearly shows the improvement in flexibility to be obtained by blending a small amount of butyl acrylate/acrylonitrile copolymer into a styrene/acrylonitrile copolymer obtained from a mixture of monomers comprising 72% by weight styrene and 28% by weight acrylonitrile. For example, the flexural deflection of the styrene/acrylonitrile copolymer was increased from 0.24 inch to a value greater than 0.80 inch, the limit of the particular test equipment used, by blending in amounts of butyl acrylate/acrylonitrile copolymer comprising 5.0 wt. percent and 10.0 wt. percent of the polyblend. Also, the addition of butyl acrylate/acrylonitrile copolymer in an amount as small as 2.5 wt. percent of the blend increased the tensile elongation at failure of the styrene/acrylonitrile from 1.8% to 20.4%. Similarly, 5.0 wt. percent of the butyl acrylate/acrylonitrile copolymer raised the tensile elongation at failure to 15.0%. In addition, 2.5% by weight and 5.0% by weight of the butyl acrylate/acrylonitrile copolymer raised the flexural strength of the styrene/acrylonitrile copolymer from 18,374 p.s.i. and 21,047 p.s.i., respectively. These improvements in the flexural properties of the styrene/acrylonitrile copolymer were obtained with little adverse affect on the Notched impact strength of the styrene/acrylonitrile copolymer and, in fact, improved the Notched impact strength somewhat at the lower concentrations of butyl acrylate/acrylonitrile copolymer.

The binary polyblend compositions obtained had very outstanding physical appearance, being clear in appearance, and could be readily injection molded to obtain products having good surface gloss. The polyblend compositions of this invention can also be subjected to compression molding and other operations which are standard for styrene/acrylonitrile copolymers. These polyblends can be used to make molded structures as well as plastic sheets suitable for cutting or otherwise converted to an intended use. They can also be mixed with other materials, such as pigments, plasticizers, natural and synthetic resins, fillers and the like, according to procedures well known to those skilled in the art.

Reasonable variation and modification of the invention as described are possible, the essence of which is that there have been provided binary polyblend compositions of styrene/acrylonitrile copolymer and butylacrylate/acrylonitrile copolymer comprising a major amount of a styrene/acrylonitrile copolymer, and methods for preparing the same.

We claim:

1. A styrene/acrylonitrile copolymer binary polyblend composition comprising a mechanical blend of a major proportion of a styrene/acrylonitrile copolymer of high styrene content and a minor proportion of a butyl acrylate/acrylonitrile copolymer of high butyl acrylate content.

2. A styrene/acrylonitrile copolymer binary polyblend composition comprising styrene/acrylonitrile copolymer of high styrene content and from 1% to 10% by weight of a butyl acrylate/acrylonitrile copolymer of high butyl acrylate content.

3. A styrene/acrylonitrile copolymer binary polyblend composition comprising styrene/acrylonitrile copolymer and from 1% to 10% by weight of a butyl acrylate/acrylonitrile copolymer, said styrene/acrylonitrile copolymer comprising a major proportion of styrene and a minor proportion of acrylonitrile and said butyl acrylate/acrylonitrile copolymer comprising a major proportion of butyl acrylate and a minor proportion of acrylonitrile.

4. A styrene/acrylonitrile copolymer binary polyblend composition comprising a mechanical blend of a major proportion of a styrene/acrylonitrile copolymer containing from 50% to 90% by weight styrene and correspondingly from 50% to 10% by weight acrylonitrile based on the weight of comonomers polymerized, and a minor proportion of a butyl acrylate/acrylonitrile copolymer containing from 85% to 95% by weight butyl acrylate and correspondingly from 15% to 5% by weight acrylonitrile based on the weight of comonomers polymerized.

5. A styrene/acrylonitrile copolymer binary polyblend composition comprising a mechanical blend of styrene/acrylonitrile copolymer containing from 50% to 90% by weight styrene and correspondingly from 50% to 10% by weight acrylonitrile, based on the weight of comonomers polymerized, and butyl acrylate/acrylonitrile copolymer containing 88.0% by weight butyl acrylate and 12.0% by weight acrylonitrile, based on the weight of comonomers polymerized.

6. A styrene/acrylonitrile copolymer binary polyblend composition comprising 97.5% by weight of a styrene/acrylonitrile copolymer containing 72% by weight styrene and 28% by weight acrylonitrile, based on the weight of comonomers polymerized, and 2.5% by weight butyl acrylate/acrylonitrile copolymer containing 88% by weight butyl acrylate and 12% by weight acrylonitrile, based upon the weight of comonomers polymerized.

7. A styrene/acrylonitrile copolymer binary polyblend composition comprising 95% by weight of a styrene/acrylonitrile copolymer containing 72% by weight styrene and 28% by weight acrylonitrile, based upon the weight of the comonomers polymerized, and 5.0% by weight butyl acrylate/acrylonitrile copolymer containing 88% by weight butyl acrylate and 12% by weight acrylonitrile, based upon the weight of comonomers polymerized.

8. A styrene/acrylonitrile copolymer binary polyblend composition comprising 90.0% by weight of a styrene/acrylonitrile copolymer containing 72% by weight styrene and 28% by weight acrylonitrile, based upon the weight of the comonomers polymerized, and 10.0% by weight butyl acrylate/acrylonitrile copolymer containing 88% by weight butyl acrylate and 12% by weight acrylonitrile, based upon the weight of comonomers polymerized.

9. A method for preparing a binary polyblend composition of a styrene/acrylonitrile copolymer and a butyl acrylate/acrylonitrile copolymer, said method comprising mechanically admixing preformed styrene/acrylonitrile copolymer containing 72% by weight styrene and 28% by weight acrylonitrile, based on the weight of comonomers polymerized with 2.5% by weight butyl acrylate/acrylonitrile copolymer.

10. A method for preparing a binary polyblend composition of a styrene/acrylonitrile copolymer and butyl acrylate/acrylonitrile copolymer, said method comprising mechanically admixing preformed styrene/acrylonitrile copolymer containing 72% by weight styrene and 28% by weight acrylonitrile, based on the weight of comonomers polymerized, with 5.0% by weight butyl acrylate/acrylonitrile copolymer.

11. A method for preparing a binary polyblend composition of styrene/acrylonitrile copolymer and butyl acrylate/acrylonitrile copolymer, said method comprising mechanically admixing preformed styrene/acrylonitrile copolymer containing 72% by weight styrene and 28% by weight acrylonitrile based on the weight of comonomers polymerized, with 10.0% by weight butyl acrylate/acrylonitrile copolymer.

12. The method for preparing a binary polyblend composition of a styrene/acrylonitrile copolymer of high styrene content and a butyl acrylate/acrylonitrile copolymer of high butyl acrylate content, said method comprising admixing a major proportion of said styrene/acrylonitrile copolymer with a minor proportion of said butyl acrylate/acrylonitrile copolymer.

References Cited in the file of this patent

UNITED STATES PATENTS

| | | |
|---|---|---|
| 2,646,417 | Jennings | July 21, 1953 |
| 2,958,670 | Hare | Nov. 1, 1960 |
| 3,041,307 | Baer | June 26, 1962 |